US010479289B2

(12) United States Patent
Jefferson et al.

(10) Patent No.: US 10,479,289 B2
(45) Date of Patent: Nov. 19, 2019

(54) ACTIVE SURROUND VIEW SYSTEM WITH SELF-CLEANING MECHANISM

(71) Applicant: TRW AUTOMOTIVE U.S. LLC, Livonia, MI (US)

(72) Inventors: Aaron M. Jefferson, Clarkston, MI (US); Robert J. Newton, Chesterfield, MI (US); Sharath Reddy, West Bloomfield, MI (US)

(73) Assignee: TRW AUTOMOTIVE U.S. LLC, Livonia, MI (US)

( * ) Notice: Subject to any disclaimer, the term of this patent is extended or adjusted under 35 U.S.C. 154(b) by 144 days.

(21) Appl. No.: 15/683,177

(22) Filed: Aug. 22, 2017

(65) Prior Publication Data

US 2019/0061640 A1    Feb. 28, 2019

(51) Int. Cl.
| | |
|---|---|
| *B60R 11/04* | (2006.01) |
| *B60S 1/02* | (2006.01) |
| *B60S 1/08* | (2006.01) |
| *B60J 1/00* | (2006.01) |
| *B60H 1/00* | (2006.01) |
| *B60S 1/04* | (2006.01) |
| *B60S 1/56* | (2006.01) |
| *E05F 15/73* | (2015.01) |
| *B60J 1/17* | (2006.01) |
| *B60R 11/00* | (2006.01) |

(52) U.S. Cl.
CPC .......... *B60R 11/04* (2013.01); *B60H 1/00821* (2013.01); *B60J 1/002* (2013.01); *B60S 1/023* (2013.01); *B60S 1/0411* (2013.01); *B60S 1/0822* (2013.01); *B60S 1/56* (2013.01); *B60H 1/00785* (2013.01); *B60J 1/17* (2013.01); *B60R 2011/0026* (2013.01); *B60R 2011/0059* (2013.01); *B60S 1/0885* (2013.01); *E05F 15/73* (2015.01); *E05F 2015/767* (2015.01); *E05Y 2900/55* (2013.01)

(58) Field of Classification Search
CPC .. B60S 1/566; B60S 1/02; B60S 1/023; B60S 1/0822; H04N 5/2254; H04N 5/2252; G02B 27/0006; E05F 2015/767; E05F 15/73; E05Y 2900/55; B60H 1/00821; B60H 1/00; B60H 1/00785; B60J 1/002; B60J 1/17
USPC .......................................................... 701/49
See application file for complete search history.

(56) References Cited

U.S. PATENT DOCUMENTS

| | | |
|---|---|---|
| 8,017,898 B2 | 9/2011 | Lu et al. |
| 8,300,886 B2 | 10/2012 | Hoffmann |

(Continued)

FOREIGN PATENT DOCUMENTS

DE    102006022404    11/2007

OTHER PUBLICATIONS

PCT/US18/43392 Written Opinion.

*Primary Examiner* — Anthony R Jimenez
(74) *Attorney, Agent, or Firm* — Tarolli, Sundheim, Covell & Tummino LLP (57) ABSTRACT

A surround view system for a vehicle includes a plurality of brackets adjacent interior surfaces of windows of the vehicle. A plurality of camera assemblies are provided within the brackets. Each camera assembly includes a lens having a field of view extending through one of the windows for capturing images of a vehicle exterior. The images captured by the lenses through the windows are integrated together to form a 360° view of the vehicle exterior.

17 Claims, 9 Drawing Sheets

(56) References Cited

U.S. PATENT DOCUMENTS

| | | |
|---|---|---|
| 8,723,954 B2 | 5/2014 | Blaesing et al. |
| 9,596,387 B2 | 3/2017 | Achenbach et al. |
| 9,762,880 B2 | 9/2017 | Pflug |
| 9,910,272 B2 | 3/2018 | Witte |
| 2008/0144924 A1* | 6/2008 | Hoffmann ............ H04N 13/246 382/154 |
| 2009/0045323 A1* | 2/2009 | Lu ..................... B60Q 1/1423 250/208.1 |
| 2014/0333729 A1* | 11/2014 | Pflug ..................... G06T 15/20 348/47 |
| 2016/0216595 A1 | 7/2016 | Carlson |

\* cited by examiner

ACTIVE SURROUND VIEW SYSTEM WITH SELF-CLEANING MECHANISM

TECHNICAL FIELD

The present invention relates generally to camera assemblies, and specifically to a surround view system within a vehicle interior.

BACKGROUND

Vehicle cameras are used for a variety of purposes, such as object detection and identification or assisting in moving the vehicle in one or more directions, e.g., back-up camera. A surround view camera system can be used to construct a 360° view of the exterior of the vehicle. This view can be displayed as a bird's eye view to the driver to help, for example, the driver prevent striking objects around the vehicle. Since the camera systems rely on the field of view of the individual camera units, it is important to keep these fields of view unobstructed during use to maximize visibility.

In current surround view systems, the cameras are provided on the exterior of the vehicle, e.g., on the side mirrors, on the exterior of the front/rear windshield, on the front grill, on the rear bumper, and along the exterior vehicle side panels. The lenses of the prior art camera assemblies are therefore exposed to the vehicle exterior, which allows dirt, debris, condensation, precipitation, etc. to collect or obstruct the camera's field of view. Consequently, the images acquired by any obstructed camera are incomplete or include distorted/inaccurate views of the actual conditions within its field of view.

Moreover, the exposed camera lenses require the manual removal of any lens obstruction by the driver or vehicle occupant wiping, cleaning, etc. the actual camera lens with a rag or the like to restore full clarify within its field of view. The lenses secured to the vehicle exterior are also exposed to objects kicked up during driving, such as rocks, trash, etc. Consequently, the lenses can be damaged due to their vulnerability along the vehicle exterior.

SUMMARY

In accordance with the present invention, a surround view system for a vehicle includes a plurality of brackets adjacent interior surfaces of windows of the vehicle. A plurality of camera assemblies are provided within the brackets. Each camera assembly includes a lens having a field of view extending through one of the windows for capturing images of a vehicle exterior. The images captured by the lenses through the windows are integrated together to form a 360° view of the vehicle exterior.

In accordance with another aspect of the present invention, a method of providing a surround view to an occupant of a vehicle includes positioning a plurality of camera assemblies adjacent to interior surfaces of vehicle windows. A camera assembly is provided within each bracket and includes a lens having a field of view extending through one of the windows. Images of a vehicle exterior are captured with the lenses. The captured images are integrated together to form a 360° view of the vehicle exterior.

Other objects and advantages and a fuller understanding of the invention will be had from the following detailed description and the accompanying drawings.

DETAILED DESCRIPTION

Figure 1:
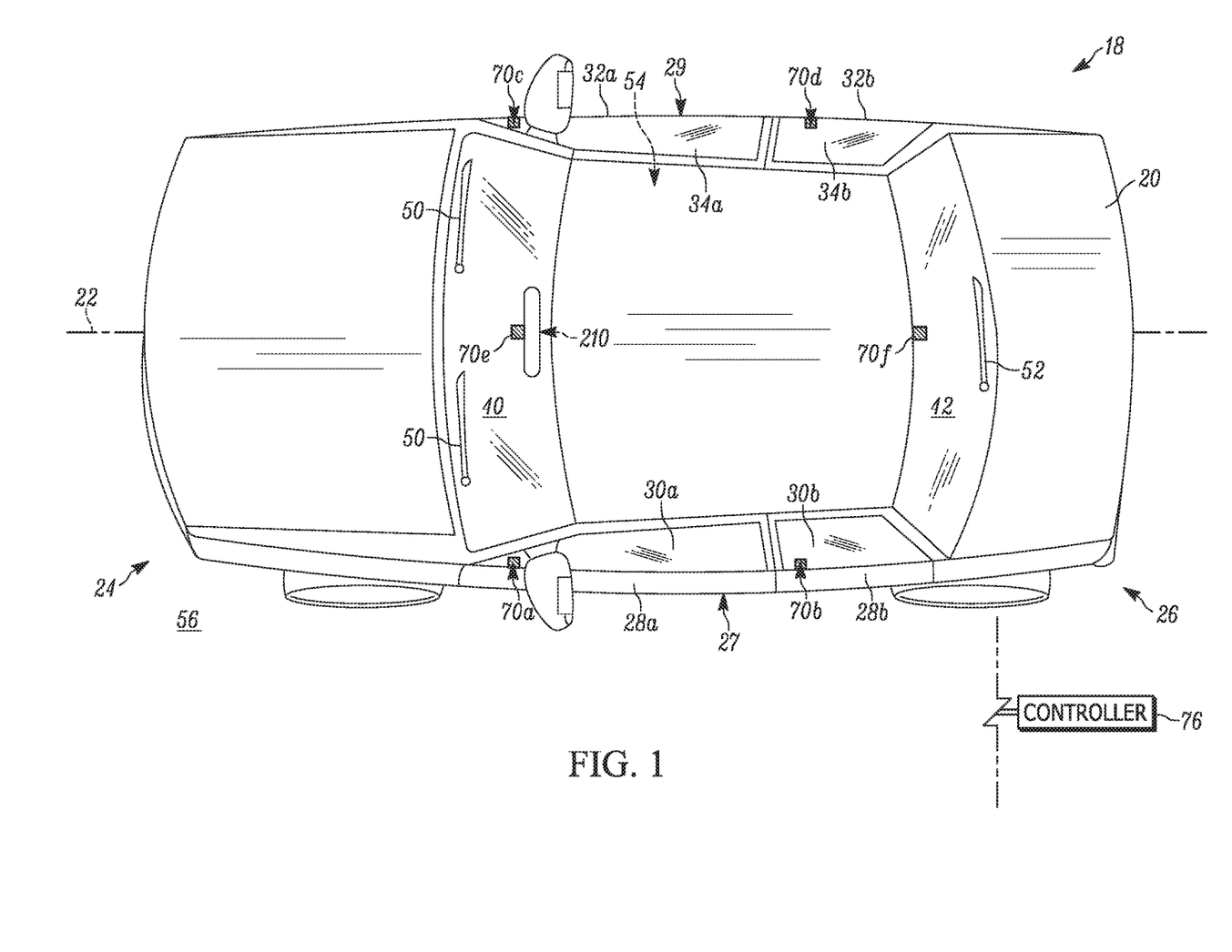
FIG. 1 is a schematic illustration of a vehicle surround view system in accordance with the present invention.
Figure 2:
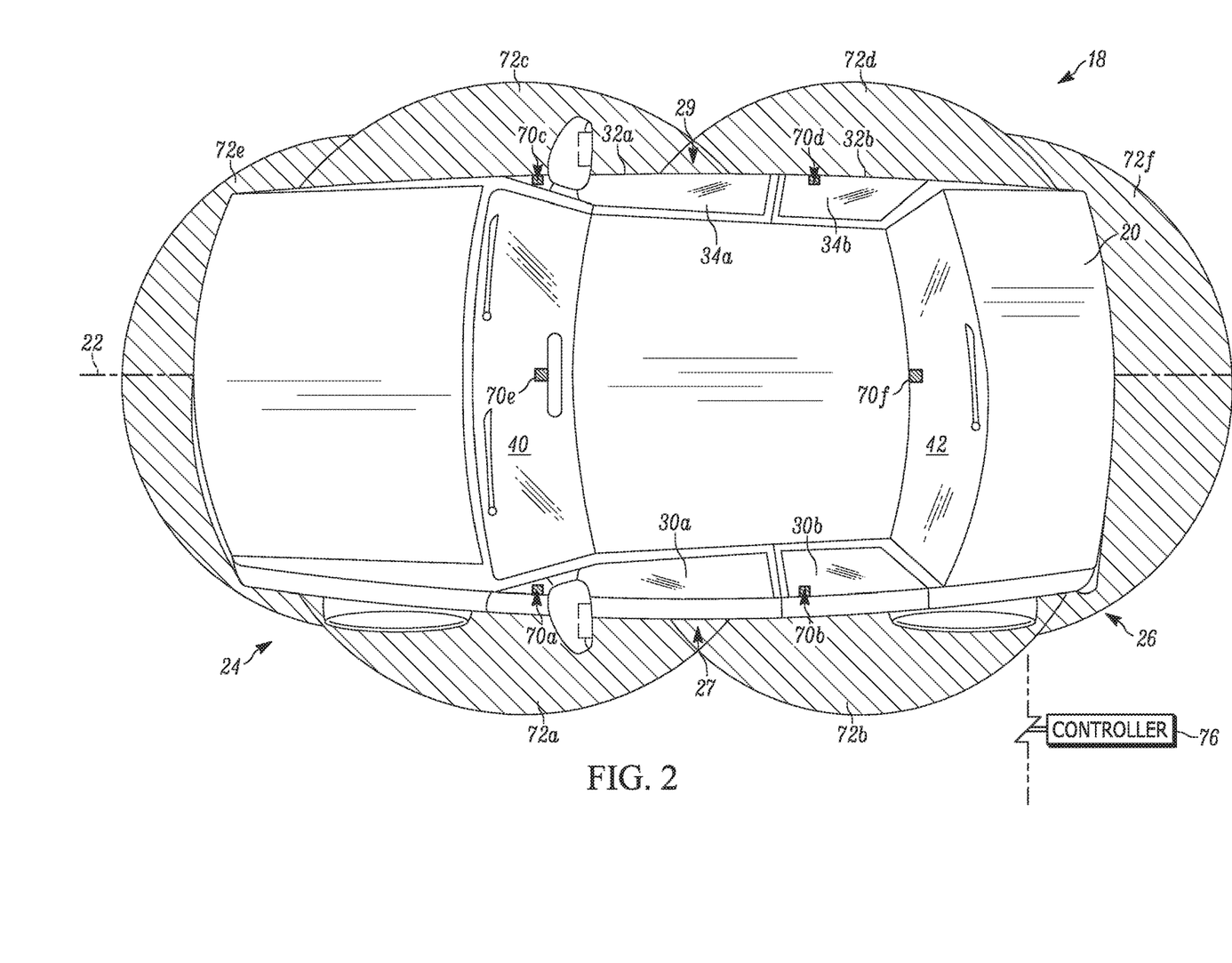
FIG. 2 is a schematic illustration of the field of view of the surround view system of FIG. 1.

The present invention relates generally to camera assemblies, and specifically to a surround view system within a vehicle interior. FIGS. 1-2 illustrate a surround view system 18 in accordance with the present invention.

Referring to FIG. 1, the surround view system 18 is implemented within a vehicle 20. The vehicle 20 extends along a centerline 22 from a front end 24 to a rear end 26. The vehicle 20 includes a driver side 27 and a passenger side 29 positioned on opposite sides of the centerline 22. The driver side 27 includes a pair of doors 28a, 28b each having an associated window 30a, 30b. The passenger side 29 includes a pair of doors 32a, 32b each having an associated window 34a, 34b. Each of the driver side 27 and passenger side 29, however, can include more or fewer doors and/or windows.

The front end 24 of the vehicle 20 includes a front window or windshield 40 extending generally between the driver side 27 and the passenger side 29. One or more windshield wipers 50 are provided on the exterior of the front windshield or window 40 for removing visual obstructions, e.g., condensation, precipitation, dirt, etc. from the front windshield. The rear end 26 of the vehicle 20 includes a rear window 42 extending generally between the driver side 27 and the passenger side 29. One or more wipers 52 are provided on the exterior of the rear window 42 for removing visual obstructions, e.g., condensation, precipitation, dirt, etc. from the rear window. The windows 30a, 30b, 32a, 32b, 40, 42 and doors 28a, 28b, 32a, 32b collectively help define an interior 54 of the vehicle 20. The exterior of the vehicle 20 is indicated generally at 56.

The surround view system 18 includes camera assemblies 70a-70f provided adjacent a plurality of the windows for capturing images of the vehicle exterior 56. As shown, camera assemblies 70a-70d are provided adjacent each window 30a, 30b, 32a, 32b. Camera assemblies 70e-70f are provided adjacent the windows 40, 42. It will be appreciated that more or fewer camera assemblies can be provided. In any case, all camera assemblies 70a-70f are electrically connected to a controller 76 in the vehicle 20.

Referring to FIG. 2, each camera assembly 70a-70f has an associated field of view 72a-72f covering a portion of the vehicle exterior 56. Collectively, the fields of view 72a-72f encircle the entire vehicle 20 and overlap one another. The controller 76 continuously receives images taken by the camera assemblies 70a-70f within the respective fields of view 72a-72f. The controller 76 stitches the images together to form a 360° surround view (not shown) of the vehicle exterior 56. This surround view is presented to the driver of the vehicle 20 on a display (not shown) in the vehicle interior 54. The surround view can assist the driver in, for example, vehicle egress, vehicle maneuverability, impact avoidance, etc.

Figure 3A:
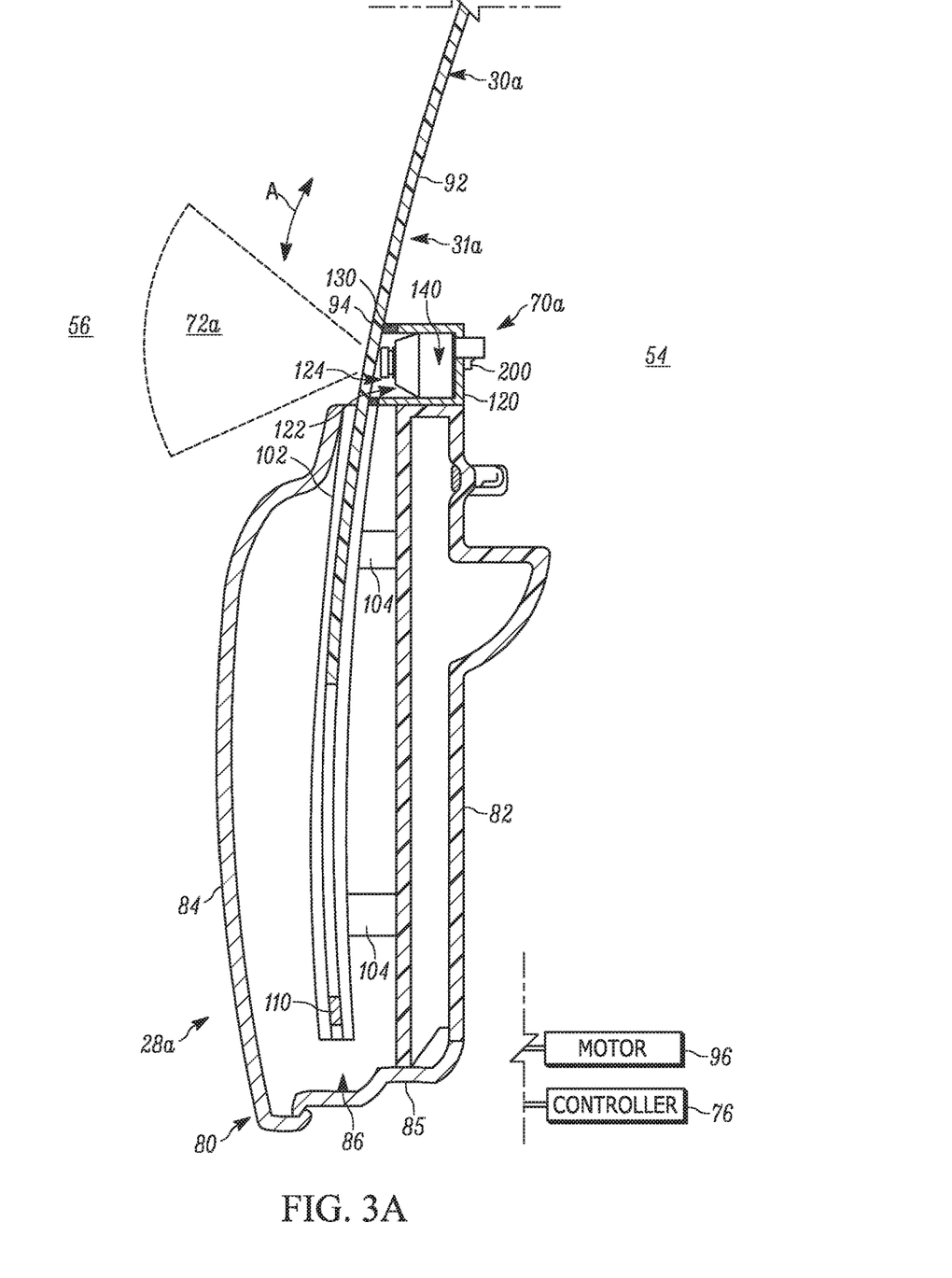
FIG. 3A is a section view of a portion of the vehicle of FIG. 1.
Figure 3B:
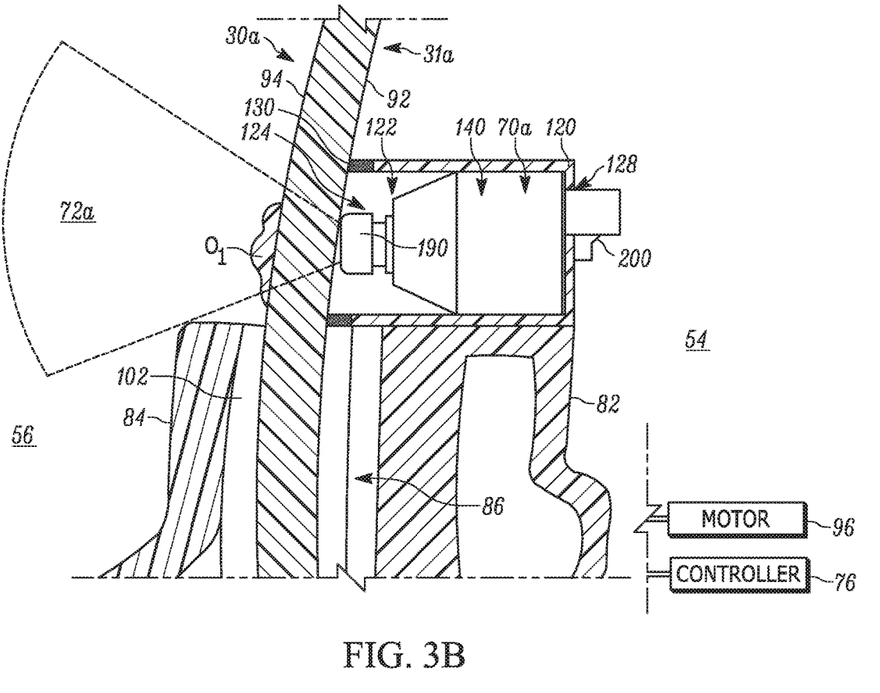
FIG. 3B is an enlarged view of a portion of FIG. 3A.

FIGS. 3A-3B illustrate a portion of the driver side door 28a, which acts as a boundary between the vehicle interior 54 and vehicle exterior 56. The door 28a includes a frame 80 having an interior panel 82 and an exterior panel 84 connected by a lower panel 85. The panels 82, 84, 85 cooperate to define a passage 86.

The window 30a extends between the panels 82, 84 and selectively obstructs an opening 31a in the door 28a. The window 30a has an interior surface 92 exposed to the vehicle interior 54 and an exterior surface 94 exposed to the vehicle exterior 56.

A track 102 is secured to the interior panel 82 via fasteners 104. The track 102 extends within the passage 86 for receiving the window 30a. The window 30a is movable within the track 102 in the manner generally indicated by the bidirectional arrow A. More specifically, the window 30a can be retracted into the passage 86 by a motor 96 to decrease blockage of the opening 31a. The window 30a can be extended out of the passage 86 by the motor 96 to increase blockage of the opening 31a. A mechanical stop 110 (FIG. 3A) is provided within the track 102 to limit the degree to which the window 30a can be retracted into the door 28a.

Although the driver side door 28a and corresponding window 30a are illustrated, it will be appreciated that every other door 28b, 32a, 32b and corresponding window 30b, 34a, 34b of the vehicle 20 has substantially the same construction and includes a corresponding motor 96 for moving the window. Consequently, the description and depiction of the specifics of the remaining doors 28b, 32a, 32b and windows 30b, 34a, 34b is omitted for brevity. That said, it will be appreciated that each door 28a, 28b, 32a, 32b is formed out of a durable material, e.g., metal, and each window 30a, 30b, 34a, 34b, 40, 42 is formed from an optically transparent or substantially transparent material, e.g., glass or polymer.

The camera assembly 70a is positioned at the bottom of the opening 31a adjacent the frame 80. The camera assembly 70a can be positioned anywhere along the length of the frame 80 in the direction of the centerline 22 (see FIG. 1) and adjacent the window 30a. Each camera assembly 70a-70d can be positioned adjacent the respective window 30a, 30b, 34a, 34b in the same position as any other camera assembly or in a different position.

In any case, the camera assembly 70a is provided within the interior 54 of the vehicle 20 adjacent the interior surface 92 of the window 30a. In one example, a bracket 120 connects the camera assembly 70a to the frame 80. The bracket 120 also positions the camera assembly 70a adjacent the interior surface 92 of the window 30a. The bracket 120 abuts the frame 80 and is secured to the interior panel 82 by one or more fasteners (not shown). The bracket 120 defines an interior or cavity 122 for receiving the camera assembly 70a. An opening 124 extends through the bracket 120 to the cavity 122. The camera assembly 70a extends into the opening 124 when positioned within the cavity 122.

A sealing member 130 formed from, for example, a non-abrasive material such as felt or rubber is provided adjacent the opening 124 in the bracket 122. The sealing member 130 has the same shape as the opening 124 and abuts the interior surface 92 of the window 30a. The sealing member 130 helps prevent dirt, debris, etc from contacting the camera assembly 70a. The sealing member 130 maintains contact with the interior surface 92 when the window 30a is extended or retracted. Due to this configuration and positioning, the camera assembly 70a has a field of view indicated generally by the area 72a extending through the window 30a to the vehicle exterior 56 (see also FIG. 2).

Figure 4A:
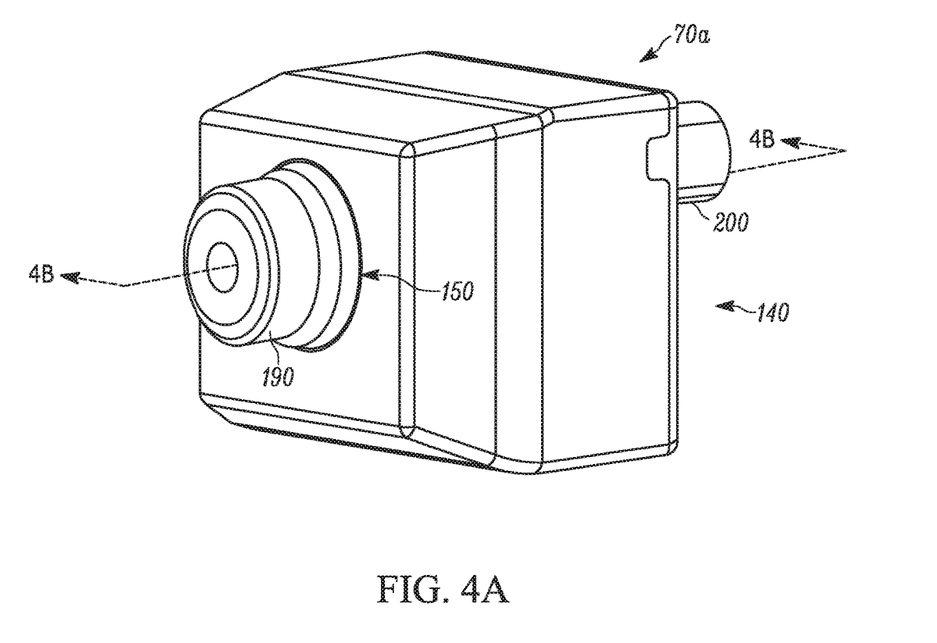
FIG. 4A is an isometric view of a camera assembly of the surround view system of FIG. 1.
Figure 4B:
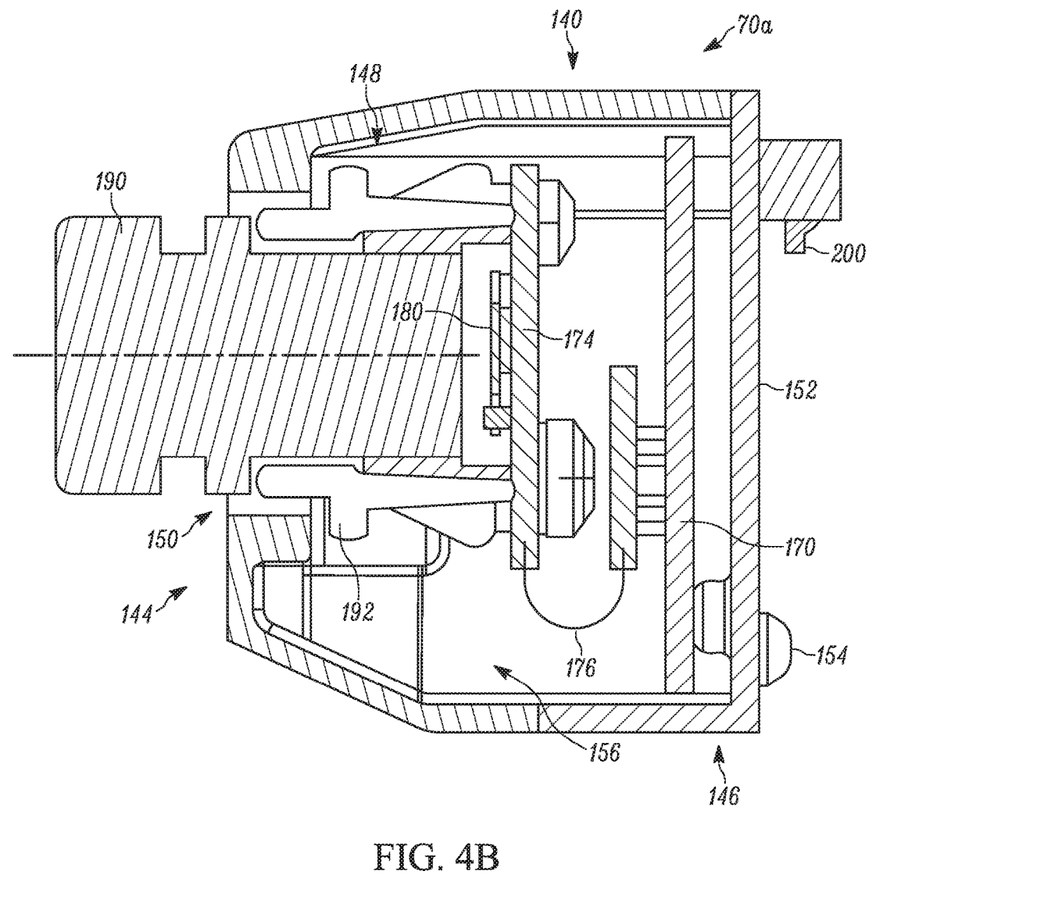
FIG. 4B is a section view of the camera assembly of FIG. 4A taken along line 4B-4B.

As shown in FIGS. 4A-4B, the camera assembly 70a includes a housing 140 defining an interior space 148. The housing 140 can be formed from a durable material such as a plastic, polymer or metal. The housing 140 extends from a first end 144 to a second end 146. The first end 144 defines an opening 150. The second end 146 defines another opening 156. A cover 152 is secured to the housing 140 via fasteners 154 to close the opening 156 at the second end 146.

First and second circuit boards 170, 174 are provided within and connected to the housing 140. The first and second circuit boards 170, 174 are electrically connected together by one or more wires 176. An image sensor 180 is provided on the second circuit board 174 facing the opening 150 in the housing 140. A lens 190 is connected to the second circuit board 174 by a fastener 192 that keeps the lens aligned with the image sensor 180. The lens 190 extends through the opening 150 in the housing 140 and defines the field of view 72a of the camera assembly 70a. The lens 190 focuses incoming light within the field of view 72a onto the image sensor 180 for capturing/producing images within the field of view around the vehicle exterior 56.

The bracket 120 is secured to the interior of the door frame 80 such that the camera lens 190 is positioned adjacent the interior surface 92 of the window 30a. The lens 190 is positioned close enough to the window 30a to maximize the field of view 72a through the window but not prevent or hinder movement of the window into and out of the door frame 80. In other words, the bracket 120 positions the camera assembly 70a in a manner that allows for unhindered relative movement between the window 30a and the camera assembly.

The camera assembly 70a further includes a fastener 200 (see FIGS. 3B and 4A) for securing the housing 140 to the bracket 120. In one example, the fastener 200 is hook-shaped and cooperates with a corresponding opening 128 in the bracket 120 to secure the camera assembly 70a to the bracket. The fastener 200 could have any alternative shape or configuration suitable for reliably securing the housing 140 to the bracket 120.

Although only the camera assembly 70a is shown and described in detail, it will be appreciated that every camera assembly 70a-70f has substantially the same construction. Consequently, the description and depiction of the specifics of the remaining camera assemblies 70b-70f are omitted for brevity.

The lens 190 of each camera assembly 70a-70f is configured to capture and record images of the vehicle exterior 56 within its respective field of view 72a-72f. In one example, the field of view 72a-72f of each lens 190, the number of camera assemblies on the vehicle 20, and/or the placement of each camera assembly along its respective window 30a, 30b, 34a, 34b, 40, 42 is configured to allow the controller 76 to provide a 360° surround view of the vehicle 20 to a vehicle occupant. To this end, the controller 76 receives real-time images of the vehicle exterior 56 within the field of view 72a-72f of each lens 190 and patches or stitches the images together in a known manner to form the surround view (see FIG. 2).

The camera system of the present invention alleviates the need for manual obstruction removal by integrating available vehicle components into the system and utilizing those components to automatically remove any obstructions in the fields of view 72a-72f. In one example, the camera system of the present invention uses the movable windows 30a, 30b, 34a, 34b and/or wipers 50, 52 to automatically remove lens 190 obstructions of the camera assembly 70a-70f associated with that particular window.

Referring back to FIG. 3A, the controller 76 is configured to sense when there is a visual obstruction $O_1$, e.g., dirt, debris, condensation, etc., within the field of view 72a of the lens 190. To this end, the controller 76 is programmed with a predetermined threshold associated with the transparency or optical clarity of the window 30a. Any obstruction $O_1$ affecting the optical clarity of the window 30a within the field of view 72a beyond the threshold will cause the controller 76 to conclude there is a visual obstruction. It will be appreciated that the controller 76 is likewise programmed to sense obstructions on the respective window 30b-30d based on the images received from the camera assemblies 70b-70d associated with the windows 30b-30d. If the threshold is not exceeded based on the images received from any of the camera assemblies 70a-70d, no further action beyond stitching the images together is taken.

In response to images transmitted by the camera assembly 70a, the controller 76 actuates one or more vehicle functions to alleviate the obstruction $O_1$ from the window 30a. In one example shown in FIG. 5, the controller 76 evaluates the images generated by the image sensor 180 in the camera assembly 70a and determines the obstruction $O_1$ is present. As a result, the controller 76 sends an actuating signal to the motor 96 associated with the obstructed window 30a to roll the window down and up in the directions A. This movement helps remove/wipe off the obstruction $O_1$ with the stationary door frame 80. The mechanical stop 110 within the track 102 (see FIG. 3A) prevents the window 30a from being rolled down to a position below the sealing member 130, i.e., to a position exposing the lens 190 to the vehicle exterior 56. This helps prevent debris from entering the opening 124 in the bracket 120 and helps prevent damage to the lens 190.

Figure 5:
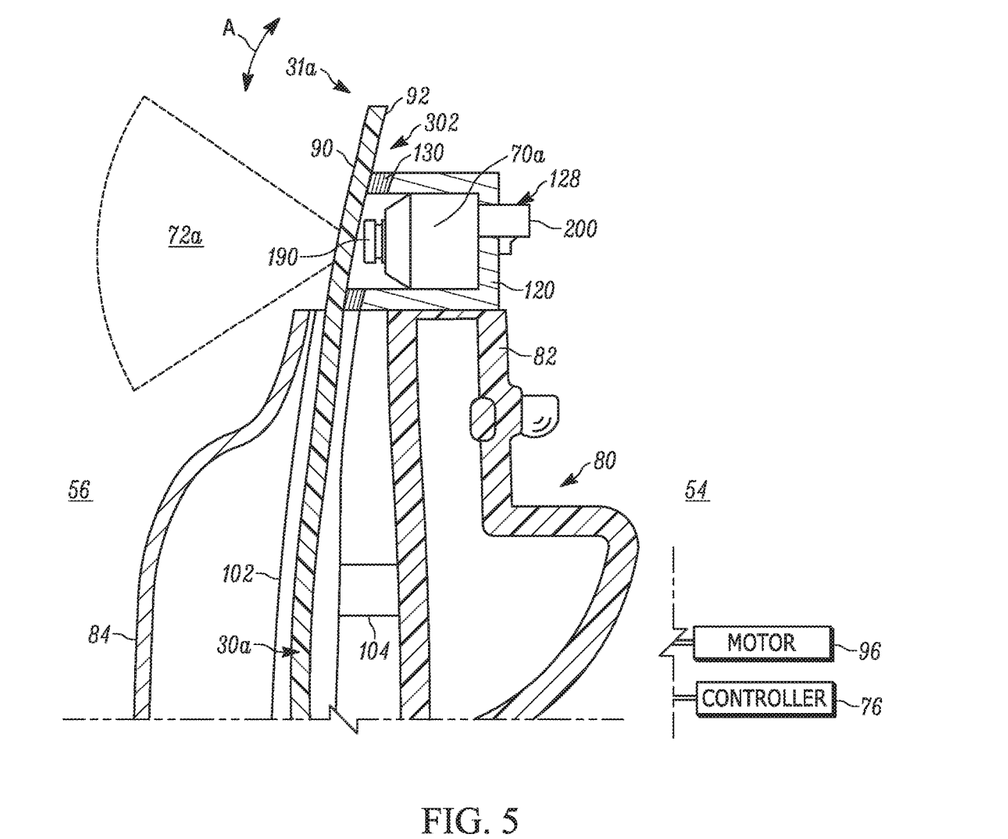
FIG. 5 is a schematic illustration of a vehicle response to a first camera assembly obstruction.

The motor 96 for the window 30a is actuated until the controller 76 determines the obstruction $O_1$ is alleviated or removed to a satisfactory degree based on the images sent from the camera assembly 70a. In other words, the motor 96 moves the window 30a in the downward direction A until the controller 76 determines from the images sent by the camera assembly 70a that the window exhibits an adequate degree of optical clarity within the field of view 72a. Once this occurs, the controller 76 sends a signal to the motor 96 to return the window 30a to the position relative to the door 28a it was in before the obstruction $O_1$ was detected or fully closes the window. This same process is undertaken for each other camera assembly 70b-70d during operation of the vehicle 20, i.e., each image sensor 180 generates images that are sent to the controller 76, which monitors the images and, when appropriate, sends signals to the respective motor 96 until the obstruction is removed.

Figure 6:
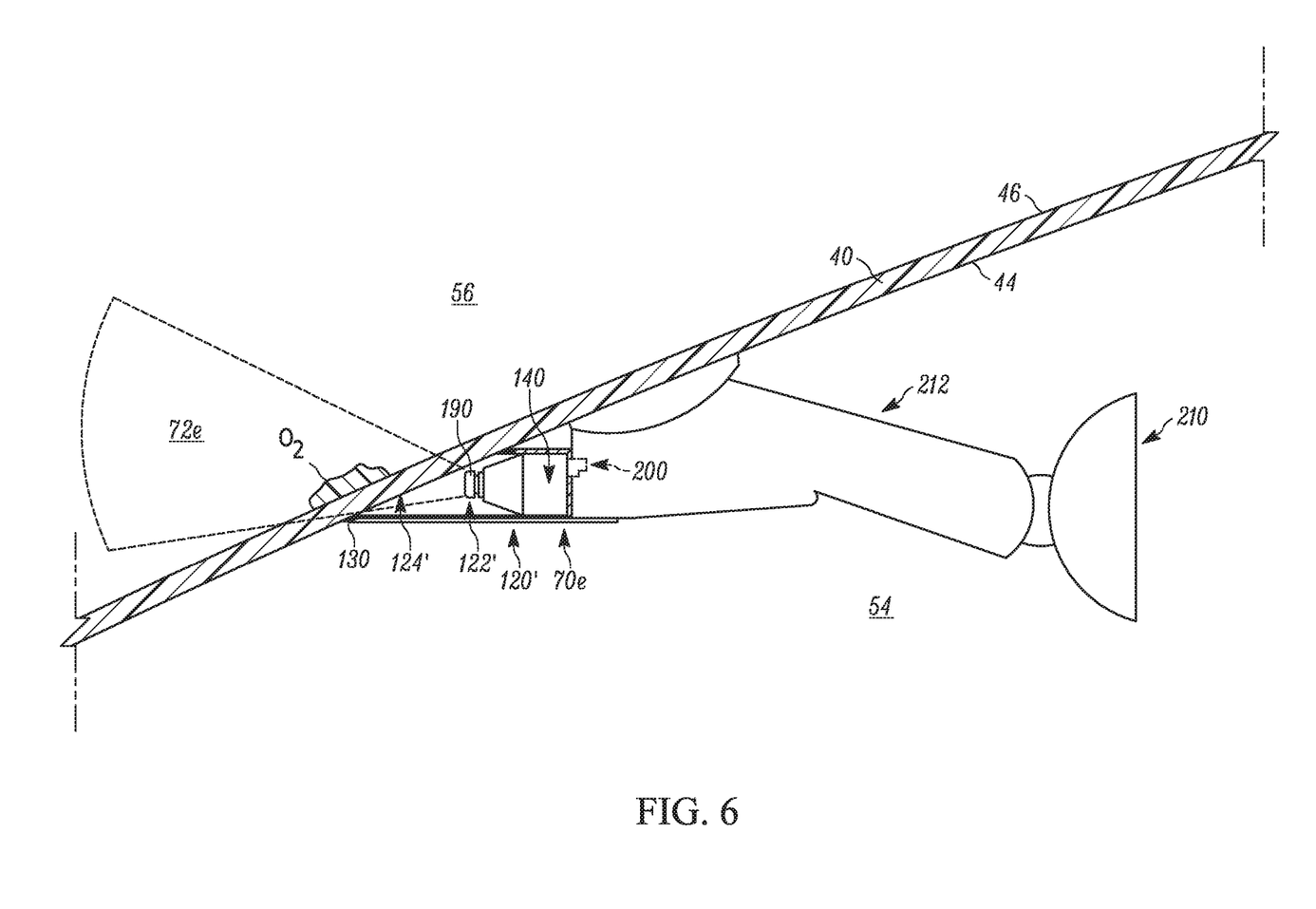
FIG. 6 is a side view of a camera assembly secured to a rear view mirror in accordance with the present invention.
Figure 7:
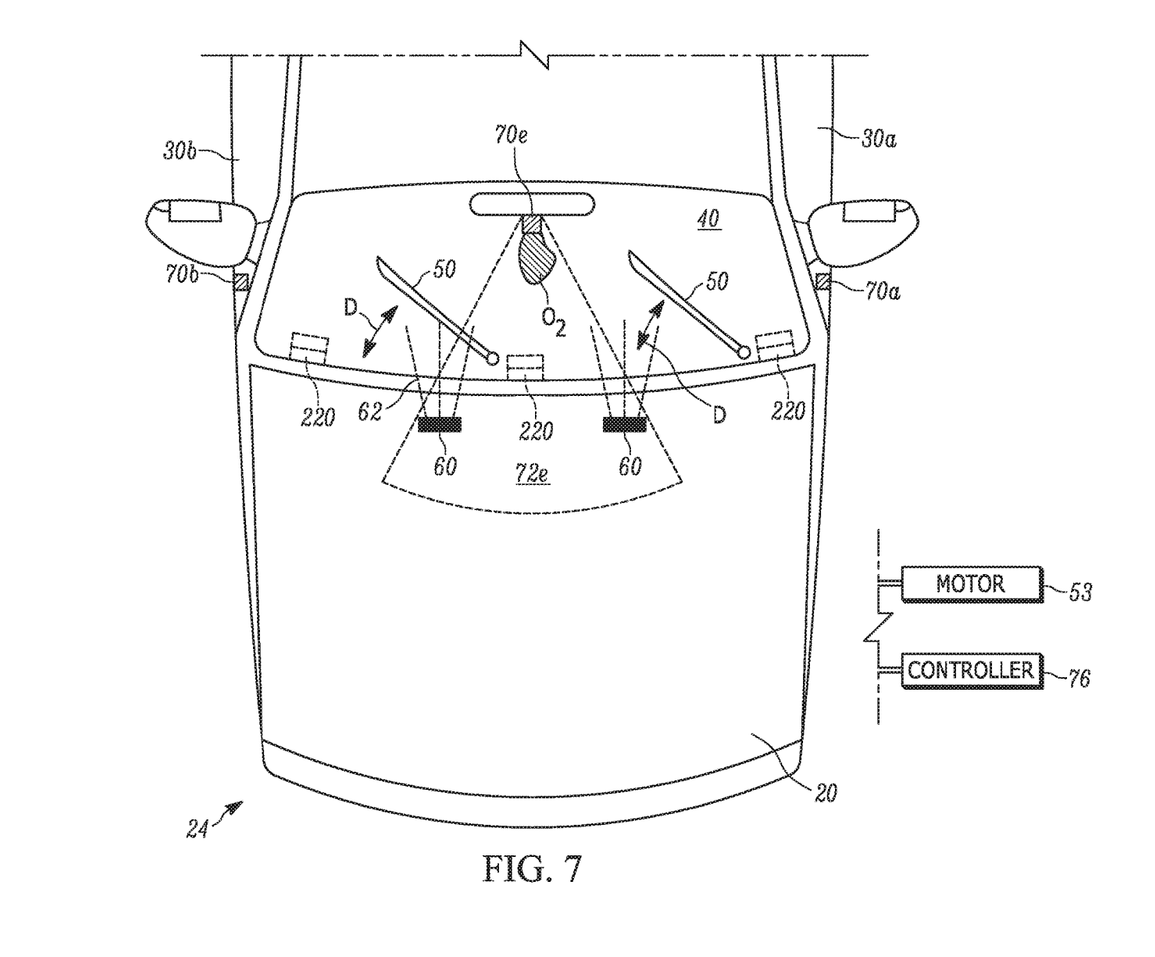
FIG. 7 is a schematic illustration of a vehicle response to a second camera assembly obstruction.

FIGS. 6-7 illustrate a scenario when an obstruction $O_2$ is detected on the front windshield 40. Referring to FIG. 6, the camera 70e associated with the front windshield or window 40 is connected to a rear view mirror 210 by a bracket 120' that accommodates the sloping front windshield 40. More specifically, the rear view mirror 210 includes a base or support member 212 secured to an interior surface 44 of the windshield 40 with an adhesive. The fastener 200 on the camera assembly 70e is secured to the support member 212 in a manner that positions the sealing member 130 against the interior surface 44 and positions the lens 190 adjacent the interior surface. Similarly, the camera assembly 70f on the rear window 42 can include a modified bracket (not shown) for securing the camera assembly to the rear window such that the lens 190 is positioned adjacent an interior surface of the rear windshield (see FIG. 1). Alternatively, the camera assembly 70f on the rear window 42 can include a bracket for securing the camera assembly to an exterior surface of the rear window (not shown).

When a visual obstruction $O_2$, e.g., dirt, debris, condensation, etc., is detected by the controller 76 on the front windshield 40 within the field of view 72e, the controller determines if the obstruction exceeds the optical threshold associated with the camera assembly 70e. If the threshold is not exceeded, no further action is taken. If, however, the threshold is exceeded, the controller 76 sends an actuation signal to one or more vehicle systems to alleviate the obstruction $O_2$ from the front windshield 40.

In one example, the controller 76 sends an actuation signal to a motor 53 associated with the wipers 50 to move the wipers back and forth across the front windshield 40 in the directions D (FIG. 7) to attempt to remove/wipe off the obstruction $O_2$ from the front windshield. Fluid dispensers 60 can also be actuated by the controller 76 to spray wiper fluid 62 onto the front windshield 40 to assist in removing the obstruction $O_2$. The wipers 50 are actuated until the controller 76 determines the obstruction $O_2$ is alleviated or removed to a satisfactory degree, i.e., adequate optical clarity within the field of view 72f is achieved. This determination is based on the images generated by the image sensor 180 of the camera assembly 70e, which are received by the controller 76. Once the obstruction $O_2$ is adequately removed, the controller 76 sends a deactivation signal to the fluid dispensers 60 and a signal to the motor 53 that returns the wipers 50 to the position shown in FIG. 1.

It is clear from the above that, depending on which window(s) 30a, 30b, 34a, 34b, 40, 42 are obstructed within their fields of view 72a-72f, the controller 76 automatically directs a vehicle component to alleviate the obstruction. If the controller 76 detects an obstruction on any of the driver side windows 30a, 30b or passenger side windows 34a, 34b, the controller actuates the motor 96 associated with each obstructed window. In response, the obstructed window 30a, 30b, 34a or 34b is rolled down and up in the directions A until the controller 76—based on images generated by the image sensor 180 of the associated camera assembly 70a-70d—determines the obstruction is removed to a predetermined degree. Once this occurs, the controller 76 actuates the motor 96 to return the window 30a, 30b, 34a or 34b to the position relative to the door 28a, 28b, 32a, 32b it was in before the obstruction was detected or fully closes the window.

If the controller 76 detects an obstruction on the front windshield 40, the controller automatically actuates the front windshield wipers 50 and washing fluid dispensers 60 to clear the front windshield of the obstruction or remove the obstruction to a predetermined degree. The dispensers 60 are deactivated and the front windshield wipers 50 returned to their unactuated state out of the field of view 72e of the camera assembly 70e when the obstruction is no longer problematic.

If the controller 76 detects an obstruction on the rear window 42, the controller automatically actuates the motor 53 for the wiper 52 to clear the rear window 42 of the obstruction or remove the obstruction to a predetermined degree. The wiper 52 is returned to its unactuated state out of the field of view 72f of the camera assembly 70f when the obstruction is no longer problematic.

Alternatively or additionally, the controller 76 can actuate the vehicle HVAC system to help alleviate a window obstruction attributed to condensation and communicate with the camera assemblies 70a-70f to turn off the HVAC system when the obstruction(s) is no longer problematic. To this end, the controller 76 can actuate dashboard vents 220 (see FIG. 7) adjacent the interior of the front windshield 40 to direct heated air or cold air onto the front windshield to help alleviate condensation or precipitation within the field of view 72e. It will be appreciated that the controller 76 can actuate other vents in the HVAC system (not shown) in proximity with an obstructed window 70 when desirable.

The controller 76 can also communicate with the camera assemblies 70a-70f upon ignition of the vehicle 20 and pre-emptively alleviate window obstructions before the vehicle is in motion. To this end, when the driver initiates vehicle 20 ignition, the controller 76 evaluates the images received from all the image sensors 180, determines if any window 30a, 30b, 34a, 34b, 40, 42 is obstructed, and actuates any window motors 96, wipers 50, 52 and/or dispensers 60 and/or vents 220 until the obstruction(s) is alleviated or optical clarity through the obstructed window is obtained to a predetermined degree. Once the vehicle 20 is in motion/use, the controller 76 continuously monitors the fields of view 72a-72f of the camera assemblies 70a-70f and automatically takes appropriate measures to remove obstructions within the fields of view to ensure that the 360° surround view presented to the driver is clear and accurate.

From the above, it is clear that the surround view system of the present invention alleviates the need for manual obstruction removal on the camera assembly by integrating available vehicle components into the system and utilizing those components to automatically remove any lens obstructions within their respective field of view.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A surround view system for a vehicle comprising:
   a plurality of brackets adjacent interior surfaces of windows of the vehicle;
   a plurality of camera assemblies within the brackets, each camera assembly including a lens having a field of view extending through one of the windows for acquiring images of a vehicle exterior, the images acquired by the lenses through the windows being integrated together to form a 360° view of the vehicle exterior; and
   a controller which receives the images from each lens and, in response to detecting a visual obstruction on one of the windows based on the received images, moves the window having the visual obstruction relative to the camera assembly to remove the visual obstruction to a predetermined degree.

2. The surround view system of claim 1, wherein the window having the visual obstruction is prevented from moving downward to a position that exposes the lens to the vehicle exterior.

3. The surround view system of claim 1, wherein the controller detects visual obstructions on the windows upon vehicle ignition.

4. The surround view system of claim 1, wherein the controller, in response to detecting a visual obstruction on one of the windows based on the received images, actuates an HVAC system of the vehicle to remove the visual obstruction to a predetermined degree.

5. The surround view system of claim 1 further comprising a sealing member secured to the bracket for engaging the interior surface of the window.

6. The surround view system of claim 1, wherein at least one of the brackets is secured to a door of the vehicle.

7. The surround view system of claim 1, wherein the controller, in response to detecting a visual obstruction on one of the windows based on the received images, moves a windshield wiper relative to the window having the visual obstruction to remove the visual obstruction to a predetermined degree.

8. The surround view system of claim 7, wherein the controller detects the visual obstruction on the window upon vehicle ignition.

9. A method of providing a surround view to an occupant of a vehicle comprising:
   positioning a plurality of brackets adjacent to interior surfaces of vehicle windows, a camera assembly being provided within each bracket and including a lens having a field of view extending through one of the windows;
   capturing images of a vehicle exterior with the lenses;
   integrating the captured images together to form a 360° view of the vehicle exterior;
   detecting a visual obstruction on one of the windows based on the images acquired by the lenses; and
   actuating a motor to move the window having the visual obstruction relative to the lens which captured the visual obstruction to remove the visual obstruction to a predetermined degree.

10. The method of claim 9, wherein the brackets are secured to the interior surface of at least one of a driver side window, a passenger side window, a front windshield, and a rear window.

11. The method of claim 9 further comprising preventing the window having the visual obstruction from moving downward to a position exposing the lens which captured the visual obstruction to the vehicle exterior.

12. The method of claim 9 further comprising detecting the visual obstruction on the window upon vehicle ignition.

13. The method of claim 9 further comprising
   actuating an HVAC system of the vehicle to remove the visual obstruction to a predetermined degree.

14. The method of claim 9, wherein at least one of the brackets is secured to a door of the vehicle.

15. The method of claim 9 further comprising securing a sealing member to the bracket for engaging the interior surface of the window.

16. The method of claim 9 further comprising
   moving a wiper relative to the window having the visual obstruction to remove the visual obstruction to a predetermined degree.

17. The method of claim 16 further comprising detecting the visual obstruction on the window upon vehicle ignition.

* * * * *